US007025817B2

(12) United States Patent
Kanke et al.

(10) Patent No.: US 7,025,817 B2
(45) Date of Patent: Apr. 11, 2006

(54) INK, RECORDING METHOD, RECORDING UNIT, INK CARTRIDGE, AND RECORDING APPARATUS

(75) Inventors: Tsuyoshi Kanke, Kawasaki (JP); Hiroshi Tomioka, Tokyo (JP); Hiroyuki Takuhara, Tokyo (JP); Shinichi Tochihara, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/050,784

(22) Filed: Feb. 7, 2005

(65) Prior Publication Data

US 2005/0126433 A1 Jun. 16, 2005

Related U.S. Application Data

(63) Continuation of application No. PCT/JP04/11737, filed on Aug. 10, 2004.

(30) Foreign Application Priority Data

Aug. 11, 2003 (JP) ............................. 2003-207040

(51) Int. Cl.
C09D 11/02 (2006.01)

(52) U.S. Cl. ................. 106/31.51; 106/31.43

(58) Field of Classification Search ............ 106/31.27, 106/31.43, 31.6, 31.75, 31.51; 347/100
See application file for complete search history.

(56) References Cited

U.S. PATENT DOCUMENTS

| 4,627,875 A | * | 12/1986 | Kobayashi et al. | ...... 106/31.49 |
| 4,723,129 A | | 2/1988 | Endo et al. | ................... 347/56 |
| 4,740,796 A | | 4/1988 | Endo et al. | ................... 347/56 |
| 5,125,969 A | | 6/1992 | Nishiwaki et al. | ....... 106/31.52 |
| 5,137,570 A | | 8/1992 | Nishiwaki et al. | ....... 106/31.52 |
| 5,256,194 A | | 10/1993 | Nishiwaki et al. | ....... 106/31.52 |
| 5,395,434 A | | 3/1995 | Tochihara et al. | ....... 106/31.43 |
| 5,476,541 A | | 12/1995 | Tochihara | ................. 106/31.48 |
| 5,560,770 A | | 10/1996 | Yatake | .................... 106/31.58 |
| 5,888,286 A | * | 3/1999 | Gregory et al. | .......... 106/31.52 |
| 5,891,230 A | * | 4/1999 | Gregory et al. | .......... 106/31.52 |

(Continued)

FOREIGN PATENT DOCUMENTS

EP 0 649 888 A2 4/1995

(Continued)

Primary Examiner—Helene Klemanski
(74) Attorney, Agent, or Firm—Fitzpatrick, Cella, Harper & Scinto

(57) ABSTRACT

An ink-jet ink comprises water, a water-soluble coloring material having a molecular weight of 600 or less as a free acid form, at least two kinds of water-soluble organic solvents, and urea or a derivative thereof. The vapor pressures at 25° C. of the at least two kinds of water-soluble organic solvents are lower than that of water. The water-soluble organic solvents include a water-soluble organic solvent A and a water-soluble organic solvent B. The solubility of the water-soluble coloring material in the water-soluble organic solvent A is higher than its solubility in water, while its solubility in the water-soluble organic solvent B is equal to or lower than its solubility in water. The difference between the solubilities of the water-soluble coloring material in the water-soluble organic solvent A and in the water-soluble organic solvent B is 10% or more. The ink-jet ink does not cause clogging of an ejection portion nor deposition of a coloring material and is capable of providing good print quality even after leaving a printed image for a long term under high temperature and humidity conditions.

11 Claims, 6 Drawing Sheets

U.S. PATENT DOCUMENTS

| | | | | |
|---|---|---|---|---|
| 5,972,086 A * | 10/1999 | Kato et al. | ............... | 106/31.43 |
| 6,086,660 A * | 7/2000 | Mukaiyama et al. | .... | 106/31.43 |
| 6,183,549 B1 * | 2/2001 | Wight | ..................... | 106/31.51 |
| 6,652,637 B1 * | 11/2003 | Mistry et al. | ............ | 106/31.52 |
| 6,706,102 B1 * | 3/2004 | Blease et al. | ............ | 106/31.47 |
| 2003/0051633 A1 * | 3/2003 | Blease et al. | ............ | 106/31.47 |
| 2003/0156175 A1 * | 8/2003 | Blease et al. | ................. | 347/97 |

FOREIGN PATENT DOCUMENTS

| | | |
|---|---|---|
| JP | 6-25573 | 2/1994 |
| JP | 8-113739 | 5/1996 |
| JP | 8-120204 | 5/1996 |
| JP | 9-95637 | 4/1997 |
| JP | 2002-138226 | 5/2002 |
| JP | 2003-20428 | 1/2003 |

* cited by examiner

INK, RECORDING METHOD, RECORDING UNIT, INK CARTRIDGE, AND RECORDING APPARATUS

This application is a continuation of International Application No. PCT/JP2004/011737, filed on Aug. 10, 2004, which claims the benefit of Japanese Patent Application No. 2003-207040 filed on Aug. 11, 2003.

BACKGROUND OF THE INVENTION

1. Field of the Invention

The present invention relates to an ink-jet ink, and a recording method, a recording unit, an ink cartridge, and a recording apparatus using the ink. In particular, the present invention relates to an ink-jet ink that does not cause clogging in an ejection orifice portion and deposition of a coloring material and is capable of providing good print quality without ink bleeding even after leaving an image printed on coated paper or the like having an ink-receiving layer for a long term under high temperature and humidity conditions. In particular, the inventions also relates to a recording method, a recording unit, an ink cartridge, and a recording apparatus using the ink.

2. Related Background Art

An ink-jet recording method is for performing recording on a recording medium such as paper by allowing small ink droplets to adhere to the recording medium. There has been a desire for the ink to be used in such a recording method to have characteristics suitable for the ink-jet recording apparatus, such as high storage stability, a lack of clogging in an ejection orifice, no deposition of a coloring material, and excellent ejection stability.

Conventionally, the use of an aqueous ink as an ink for ink-jet recording has occasionally resulted in troubles such as a clogged nozzle due to moisture exuding from the ink supplied from a recording head. To solve this problem, it has been reported that the use of a dissolution auxiliary agent in an ink is effective to improve the solubility of a water-soluble coloring material in the ink even after water evaporates from the ink (see, e.g., Japanese Patent Application Laid-Open Nos. H06-025573, H08-120204, and H09-095637). The dissolution auxiliary agent added may be a certain amount of a water-soluble organic solvent capable of dissolving a large amount of a coloring material or urea or a derivative thereof with an excellent moisture-retaining property.

However, when an image is recorded on a so-called coated paper prepared by forming an ink-receiving layer containing a pigment and a binder on a substrate such as paper, in accordance with an ink-jet process using a water-soluble organic solvent capable of dissolving a large amount of a coloring material or urea or a derivative thereof having an excellent moisture-retaining ability, a decrease in print quality may occur because of ink bleeding caused after leaving the image for a long term under certain environmental conditions, in particular, under high temperature and humidity conditions (hereinafter the ink bleeding under such conditions will be also referred to as the "ink bleeding at high temperature and humidity").

SUMMARY OF THE INVENTION

The inventors of the present invention have made studies and found that the phenomenon described above occurs more notably as a water-soluble coloring material has a smaller molecular weight (e.g., a molecular weight of 600 or less in the form of a free acid). Besides, the inventors of the present invention have found that the ink bleeding at high temperature and humidity tends to be caused in proportion to an increase in content of the water-soluble organic solvent capable of dissolving a large amount of a coloring material in the ink or an increase in content of urea or a derivative thereof having an excellent moisture-retaining property.

Therefore, a method of effectively preventing the ink bleeding phenomenon at high temperature and humidity might be a reduction in the content of the water-soluble organic solvent capable of dissolving a large amount of a coloring material or a reduction in the content of urea or a derivative thereof having an excellent moisture-retaining property in the ink; the organic solvent, and urea and its derivative are regarded as causative agents. However, when the content of the water-soluble organic solvent or the content of urea or the derivative thereof in the ink is not higher than a predetermined level, clogging in an ejection orifice portion or deposition of the coloring material may occur.

It is therefore an object of the present invention to provide an ink-jet ink containing a water-soluble coloring material having a molecular weight of 600 or less in the form of a free acid that meets the characteristics required of an ink for ink-jet recording, does not cause clogging in an ejection orifice portion and deposition of a coloring material, and is capable of providing good print quality without ink bleeding even after leaving an image printed on coated paper or the like having an ink-receiving layer for a long term under high temperature and humidity conditions.

Another object of the present invention is to provide an ink-jet recording method, a recording unit, an ink cartridge, and a recording apparatus using the ink.

The above-mentioned objects are attained by the following constructions of the present invention. That is, the present invention relates to an ink, comprising water, a water-soluble coloring material having a molecular weight of 600 or less in a free acid form, at least two kinds of water-soluble organic solvents, and urea or a derivative thereof, wherein the ink satisfies the conditions that:

(1) the at least two kinds of water-soluble organic solvents show a vapor pressure lower than the vapor pressure of water at 25° C.;

(2) when a comparison is made between a solubility of the water-soluble coloring material in each of the water-soluble organic solvents and a solubility of the water-soluble coloring material in water, the water-soluble organic solvents that satisfy the condition (1) include a water-soluble organic solvent A giving the solubility higher than the solubility in water and a water-soluble organic solvent B giving the solubility equal to or lower than the solubility in water; and (3) the solubility difference between the solubility of the water-soluble coloring material in the water-soluble organic solvent A and the solubility of the water-soluble coloring material in the water-soluble organic solvent B is 10% or more.

Also, the present invention relates to a recording method, comprising ejecting droplets of the ink from an orifice in response to a recording signal.

Also, the present invention relates to a recording unit, comprising an ink containing portion containing the ink, and a head portion for ejecting droplets of the ink.

Also, the present invention relates to an ink cartridge, comprising an ink containing portion containing the ink.

Also, the present invention relates to a recording apparatus, comprising a recording unit that includes an ink containing portion containing the ink, and a head portion for ejecting droplets of the ink.

DESCRIPTION OF THE PREFERRED EMBODIMENTS

Figure 1:
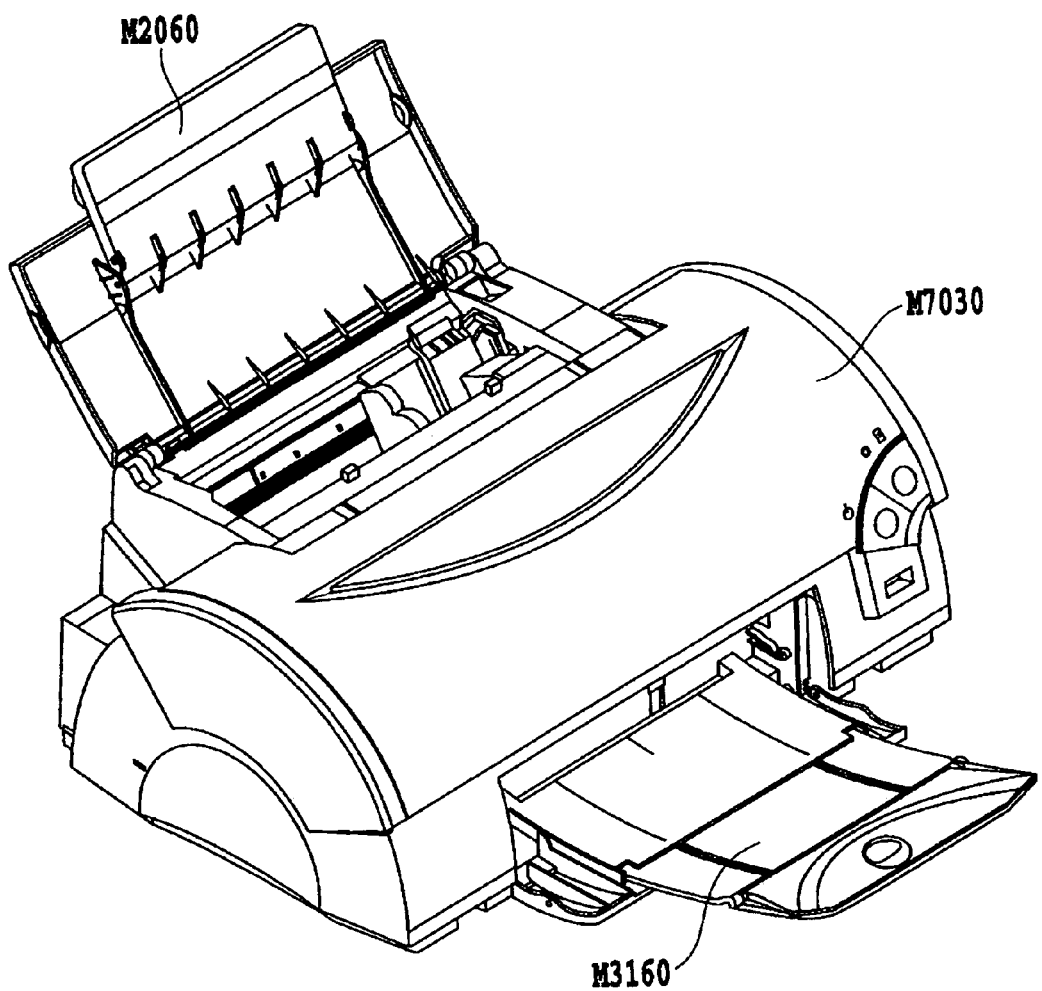
FIG. 1 is a perspective view of a recording apparatus in accordance with an embodiment of the present invention.

In view of the objects described above, with respect to an ink that contains water, a water-soluble coloring material having a molecular weight of 600 or less in the form of a free acid, and a water-soluble organic solvent capable of dissolving a large amount of a coloring material, and urea or a derivative thereof, the inventors of the present invention have conducted various studies on the water-soluble organic solvents to be used in the ink. Finally, the inventors of the present invention have completed the present invention by finding that the use of at least two water-soluble organic solvents that satisfy the conditions described below will be effective for preventing the occurrence of ink bleeding at high temperature and humidity without impairing ink-jet characteristics.

Specifically, at first, an ink contains at least two kinds of water-soluble organic solvents having vapor pressures lower than that of water at 25° C. Secondly, when a comparison is made between the solubility of the water-soluble coloring material constituting an ink in each of the water-soluble organic solvents and the solubility of the water-soluble coloring material in water as a reference, the water-soluble organic solvents that satisfy the first condition include a water-soluble organic solvent A having a solubility higher than the solubility of water and a water-soluble organic solvent B having a solubility equal to or lower than the solubility of water. Thirdly, the solubility difference between the solubility of the water-soluble coloring material in the water-soluble organic solvent A and the solubility of the water-soluble coloring material in the water-soluble organic solvent B should be 10% or more.

In the ink according to the present invention, the reason why neither clogging of an ejection orifice portion nor deposition of a coloring material occurs is, as reported conventionally, that the water-soluble organic solvent which is capable of increasing solubility of the water-soluble coloring material in ink and the urea and the derivative thereof which are excellent in moisture-retaining property are used in combination. According to the studies conducted by the inventors of the present invention, in particular, with respect to the tendency of causing deposition of the coloring material in the ejection orifice portion, an excellent effect can be exerted on the deposition of the coloring material when urea or a derivative thereof is used, which has an excellent moisture-retaining property. Therefore, clogging in an ink ejection orifice portion and deposition of a coloring material can be prevented.

The inventors of the present invention consider why an image formed using the ink according to the present invention as described above will prevent the ink bleeding at high temperature and humidity, as follows:

First, the process of causing ink bleeding at high temperature and humidity in the conventional ink will be described. When an image is recorded on a recording medium using an aqueous ink containing water as a main ingredient, water evaporates from the recording medium. After the evaporation of water, the ink ingredients remaining in the recording medium include a water-soluble organic solvent and a coloring material, which have vapor pressures lower than that of water. When the recording medium used is coated paper having an ink-receiving layer, a water-soluble organic solvent may remain in the ink-receiving layer after the water evaporation. In this case, part of a coloring material in the ink-receiving layer is being dissolved in the water-soluble organic solvent. When the recording medium in such a state is left for a long term under high temperature and humidity conditions, atmospheric moisture will be mixed into the ink-receiving layer. In other words, leaving the recording medium for a long term under high temperature and humidity conditions, there is supplied a medium that allows the transport of the water-soluble coloring material in the ink-receiving layer. As a result, while leaving the image for a long term under high temperature and humidity conditions, the water-soluble coloring material in a state of being dissolved in the ink may move through the ink-receiving layer together with the moisture, causing the ink bleeding from the recording image. According to the studies conducted by the inventors of the present invention, in particular, an ink containing a water-soluble coloring material having a small molecular weight, for example, a molecular weight of 600 or less, showed the tendency of moving easily through the ink-receiving layer because of a smaller molecular size of the coloring material.

While the ink of the present invention contains a water-soluble coloring material having a molecular weight of 600 or less, the ink also contains, as a water-soluble organic solvent having a vapor pressure lower than that of water, a water-soluble organic solvent A in which the solubility of the water-soluble coloring material is higher than the solubility thereof in water and a water-soluble organic solvent B in which the solubility of the water-soluble coloring material is lower than the solubility thereof in water.

In an image recorded on a recording medium using the ink of the present invention constructed as described above, after water evaporation in storage of the image, there remain both the water-soluble organic solvent A and the water-soluble organic solvent B which are different in solubility of the water-soluble coloring material used as a coloring material in the ink. Therefore, when an image is formed using the ink of the present invention is left for a long term under high temperature and humidity conditions, the water-soluble coloring material dissolved in the ink-receiving layer becomes unstable. Therefore, the recording image may be prevented from ink bleeding as the water-soluble coloring material may be prevented from moving through the ink-receiving layer. Given above is a point of view of the inventors of the present invention.

In addition, further studies conducted by the inventors of the present invention have revealed that there is a need for a 10% or greater difference between the solubility in the water-soluble organic solvent A and the solubility in the water-soluble organic solvent B of the water-soluble coloring material to more effectively suppress the occurrence of image bleeding at high temperature and humidity.

Hereinafter, the constitutional ingredients of the ink of the present invention will be described, respectively.

(Water-soluble Coloring Material)

As a water-soluble coloring material used in the present invention may be any of water-soluble coloring materials having their respective molecular weights of 600 or less in the form of free acids. For instance, a dye having a molecular weight of 600 or less in the form of a free acid may be used.

Although the dye may be a well-known dye generally used in the art or a dye newly synthesized, for example, the dye may be an acidic dye, direct dye, or edible dye.

In the present invention, the content of the coloring material in ink is preferably 0.1 to 15.0 mass %, particularly preferably 0.5 to 5.0 mass % with respect to the total mass of the ink.

Furthermore, the coloring material of the invention may be used alone or two or more materials may be used in combination. If two or more coloring materials are used in mixture, there is no need that all of the dyes used should have a molecular weight of 600 or less in the form of a free acid. At least one of the dyes may have a molecular weight of 600 or less in the free acid form in the ink. The proportion of the dye having a molecular weight of 600 or less in the form of a free acid to the total amount of dye in the ink is preferably 5 to 100%, particularly preferably 10 to 100% on the mass basis.

As a suitable water-soluble coloring material that constitutes the ink of the present invention, the ink may contain a coloring material represented by the following general formula (I) in the form of a free acid. That is, if the coloring material represented by the following general formula (I) is used as a water-soluble coloring material that constitutes the ink of the present invention, the effects of the present invention can be attained more notably in that no clogging in a discharge orifice portion nor deposition of a coloring material occurs and also a decrease in print quality with ink bleeding does not occur even if an image obtained by printing on coated paper having an ink-receiving layer is left for a long term under high temperature and humidity conditions.

General Formula (I)

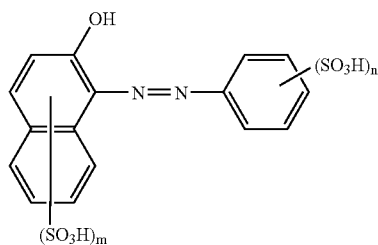

wherein m is an integer of 0 to 2, n is an integer of 0 to 1 where (m+n) is an integer of 1 or more.

In the present invention, the coloring material in the form of a free acid (free-acid form) may be used as it is. Alternatively, the salt form coloring material obtained at the time of manufacture may be used as it is or may be modified into a desired salt form when in use. Furthermore, in the above general formula (I), part of the coloring material may be constructed such that part of an acidic group may be in the form of a salt. Furthermore, the coloring material may be a mixture of the salt form coloring material and the free-acid form coloring material.

The salt form coloring materials include salts of alkali metals such as Na, Li, and K; ammonium salts which may be substituted with an alkyl or hydroxyalkyl group; and organic amine salts. In this case, the organic amines include lower alkyl amines, hydroxy-substituted lower alkyl amines, carboxy-substituted lower alkyl amines, and polyamines having 2 to 10 alkylene imine units each having 2 to 4 carbon atoms. In the case of these salt forms, the number of salt forms in the ink is not limited to one. Two or more of these salt forms may be contained in the ink. In the configuration of the coloring material used in the present invention, when two or more acid groups are included in one molecule, the two or more acid groups may be the same salt or acid group or may be different from each other. Furthermore, if the coloring material is of a salt form, the coloring material is present in the ink as dissociated into anions and cations.

Specific examples of the coloring material represented by the general formula (I) above include those having the following structure. However, the coloring material used in the present invention is not limited to any of them.

Exemplified Compound 1

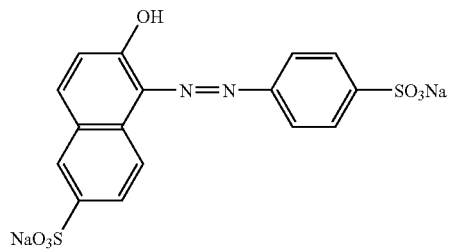

Exemplified Compound 2

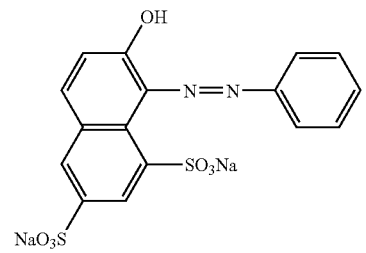

(Water-soluble Organic Solvent)

Water-soluble organic solvents which can be used in the present invention, although not particularly limited to those of specific types or the like, may be those that show water solubility and satisfy the three conditions described above in combination, including alcohols, polyvalent alcohols, polyglycols, glycol ethers, nitrogen-containing polar solvents, and sulfur-containing polar solvents.

In the present invention, the difference between the solubility of the water-soluble coloring material in the water-soluble organic solvent A and the solubility of the water-soluble coloring material in the water-soluble organic solvent B is 10% or more, particularly preferably 15% or more but preferably not more than 30%. Adjusting such a percentage within this range makes it possible to bring out the effects of the present invention more greatly.

Furthermore, in the present invention, the total amounts of the water-soluble organic solvents A and B, between which the difference in solubility of the water-soluble coloring material is 10% or more, is preferably 80 mass % or more with respect to the total amount of water-soluble organic solvents in the ink. By adjusting the proportion as described above, the ink bleeding at high temperature and humidity from an image formed can be more effectively prevented and also the clogging in an ejection orifice portion and the deposition of a coloring material can be prevented.

Furthermore, in the present invention, the mixing ratio between the water-soluble organic solvent A and the water-soluble organic solvent B is preferably 4:1 to 1:1, particularly preferably 3.5:1 to 2.5:1 (the water-soluble organic solvent A : the water-soluble organic solvent B) based on mass. Adjusting the mixing ratio within this range makes it possible to bring out the effects of the present invention more greatly.

Furthermore, considering the effects of the present invention, the physical properties of the ink, effective permeation of the ink to the recording medium, and so on, the total content of the water-soluble organic solvent in the ink of the present invention is preferably in the range of 10 to 35 mass %, more preferably in the range of 15 to 30 mass % with respect to the total amount of ink in mass ratio.

For selecting a water-soluble organic solvent to be used in the ink of the present invention, the solubility of a specific water-soluble coloring material to be used in the ink in each water-soluble organic solvent is determined in advance by the process described below. Then, a selection is made for a water-soluble organic solvent where the solubility of the water-soluble coloring material in the water-soluble organic solvent is higher than the solubility of the water-soluble coloring material in water, and for a water-soluble organic solvent where the solubility of the water-soluble coloring material in the water-soluble organic solvent is equal to or lower than the solubility of the water-soluble coloring material in water.

Other water-soluble organic solvents, which do not correspond to the water-soluble organic solvent A and the water-soluble organic solvent B, include methanol, ethanol, isopropyl alcohol, acetone, and methyl ethyl ketone, having higher vapor pressures at 25° C., as compared with that of water.

(Vapor Pressure of Water-soluble Organic Solvent)

In the present invention, the vapor pressure of the water-soluble organic solvent is determined at 25° C. with the general method. Alternatively, even if it is not actually measured, the value described in any of various references can be used. In addition, even if there is no description of vapor pressure at 25° C. in the reference, for example, if the vapor pressure of the water-soluble organic solvent at 50° C. is lower than the vapor pressure of water at 25° C., the vapor pressure of the water-soluble organic solvent at 25° C. can be expected to be lower than that of water.

(Solubility of Water-soluble Coloring Material)

In the present invention, the solubility of the water-soluble coloring material for each water-soluble organic solvent was determined by the following procedures. First, when the water-soluble coloring material is in liquid form, 50 g of an aqueous solution in which a coloring material was dissolved was charged in a 100-ml beaker (JIS R3503 and left in a thermostat oven (60° C., 20% RH). Subsequently, the solution was evaporated to dryness until a mass change every 3 hours reached a constant mass of 0.01 g or less. Then, the resulting solidified colorant was mashed in a mortar into fine powder. However, when the coloring material is in powder form, it can be used without such pretreatment. The colorant powder thus obtained was added to water or each water-soluble organic solvent to be provided as a target of the measurement and then dissolved therein until it reached a saturation level to make the colorant again in liquid form. At this time, the mass of the powdery coloring material required in the dissolution was determined and divided by the total mass of the water or water-soluble organic solvent and the powdery coloring material to obtain the solubility (%) of the powdery coloring material.

Furthermore, in the present invention, depending on the type of the coloring material, the water-soluble organic solvent A is preferably glycerin, ethylene glycol, diethylene glycol, or polyethylene glycol. Among them, glycerin or ethylene glycol is particularly preferable. In addition, the water-soluble organic solvent B is preferably 2-pyrrolidone or 1,5-pentanediol, particularly preferably 2-pyrrolidone.

(Urea and Derivative Thereof)

In the present invention, for preventing clogging in an ejection orifice portion and deposition of a coloring material, urea or a derivative thereof is used as a moisture-retaining solid content in ink. The derivatives of urea include ethylene urea, propylene urea, diethyl urea, and thiourea, and two or more of them may be concurrently used together. In the present invention, the use of urea or ethylene urea may be particularly preferable. In the present invention, the content of urea or a derivative thereof in the ink is preferably in the range of 3 to 10 mass % with respect to the total amount of the ink in consideration of an influence on the ink bleeding at high temperature and humidity.

(Water)

The content of water in the ink of the present invention is preferably in the range of 45 to 85 mass % with respect to the total amount of ink. If the content of water is less than the predetermined content thereof, the solubility of the coloring material tends to be reduced and the ink also tends to increase its viscosity. On the other hand, if the content of water is higher than the predetermined content of water, clogging in an ejection orifice portion and deposition of a coloring material cannot be prevented sufficiently because of an excess amount of evaporated ingredients.

(Surfactant and Additives)

In the present invention, within the range that does not impair the effect of the present invention, a surfactant and other additives may be used in the ink. The surfactants which can be used in this case include anion surfactants such as fatty acid salts, higher alcohol sulfates, liquid fatty oil sulfates, and alkylaryl sulfonates; non ionic surfactants such as polyoxyethylene alkyl ethers, polyoxyethylene alkyl esters, polyoxyethylene sorbitan alkyl esters, acetylene alcohols, and acetylene glycols, and each of them may be suitably selected and used alone or in combination with one or more of the rest. Among them, in particular, acetylene alcohols and acetylene glycols are preferable because of their excellent effects on permeability through plain paper.

The amount of the surfactant used, which varies depending on the amounts of the other ink ingredients added, is preferably about 0.01 to 5 mass % with respect to the total amount of the ink. At this time, the amount of the surfactant used is defined such that the surface tension of the ink at 25°

C. is preferably 10 mN/m (dyn/cm) or more, particularly preferably 20 mN/m or more but not more than 60 mN/m. This is because, when it is applied in an ink-jet recording system, the displacement of printing (i.e., the displacement of the impact point of an ink droplet) or the like caused by the wet tip of a nozzle can be effectively prevented.

In addition, other additives include a pH adjustor, a rust preventive, an antiseptic agent, a fungicide, an antioxidant, an anti-reducing agent, an evaporation accelerator, a chelating agent, and a water-soluble polymer. In addition, for obtaining preferable ejection characteristics of the ink in an ink-jet recording apparatus, the ink is preferably adjusted to have a desired viscosity and pH.

(Recording Medium)

The ink of the present invention constructed as described above can be, needless to say, used for any general recording medium. In particular, the ink of the present invention exerts excellent effects when the ink is used for conducting ink-jet recording on a specific recording medium (specific medium) such as coated paper having an ink-receiving layer on its surface. Hereinafter, an example of the specific medium, which can be used in the present invention, will be described in more detail. For instance, the recording medium may be one on which an image can be formed such that at least a coloring material such as a dye or pigment in an ink is adsorbed on fine particles that form a hydrophilic porous structure in the ink-receiving layer formed on the surface of the recording medium. Such a kind of recording medium is suitable especially when it is used in an ink-jet recording method. Among those recording mediums, a recording medium of a so-called absorption type that absorbs the ink by use of gaps formed in the ink-receiving layer on a base material is particularly preferable since the use of the ink according to the present invention produces an excellent effect.

This absorption type ink-receiving layer is formed as a hydrophilic porous layer including mainly fine particles and optionally a binder or other additives. The fine particles include inorganic pigments such as silica, clay, talc, calcium carbonate, kaolin, alumina, alumina hydrate, diatomaceous earth, titanium oxide, hydrotalcite, and zinc oxide; and organic pigments such as urea formalin resin, ethylene resin, and styrene resin. One or more of these compounds can be used as fine particles.

Binders suitable for the formation of an ink-receiving layer may be water-soluble polymers and latex. Examples of the binder include polyvinyl alcohol or a modified product thereof, starch or a modified product thereof, gelatin or a modified product thereof, gum arabic, cellulose derivatives such as carboxymethyl cellulose, hydroxyethyl cellulose, and hydroxypropyl methyl cellulose, SBR latex, NBR latex, methyl methacrylate-butadiene copolymer latex, polymerized latex with a modified functional group, and vinyl copolymer latex such as ethylene-vinyl acetate copolymer, polyvinyl pyrrolidone, maleic anhydride or a copolymer thereof, and an acrylic ester copolymer. Further, as the need arises, two or more of them may be selected and used in combination.

For the formation of an ink-receiving layer, other additives may be also used as the need arises. The other additives include a dispersant, a thickener, a pH adjustor, a lubricant, a fluidity modifier, a surfactant, a defoaming agent, a mold releasing agent, a fluorescent whitening agent, a UV absorber, and an antioxidant.

If the coloring material is originally in powder form, the coloring material is dissolved in an objective solvent until it reaches a saturation level. The solubility of the coloring material is determined by dividing the mass of the powdery coloring agent required for the dissolution by the total mass of the solvent and powdery coloring material.

(Recording Apparatus)

Figure 2:
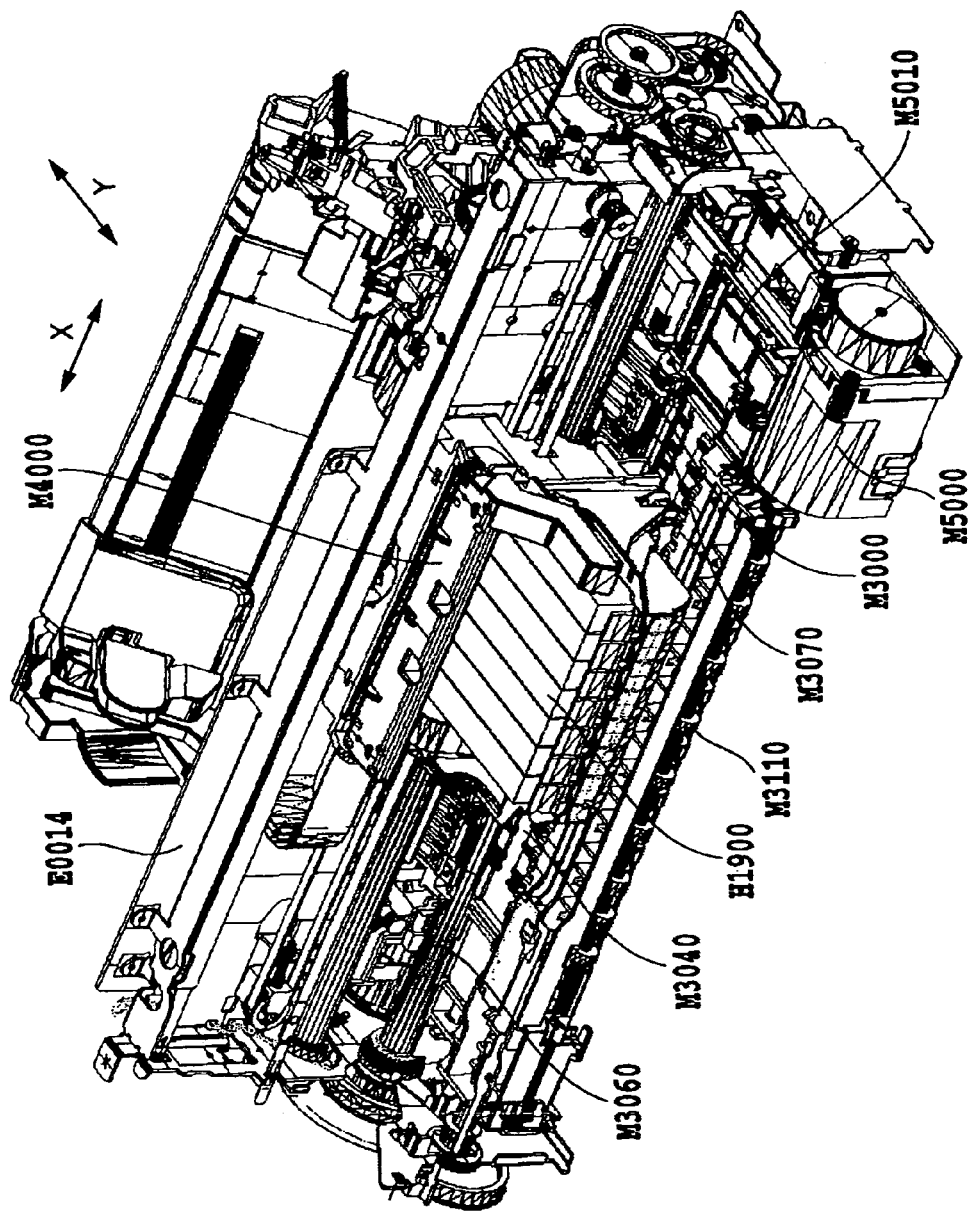
FIG. 2 is a perspective view of a mechanism portion of the recording apparatus in accordance with the embodiment of the present invention.
Figure 3:
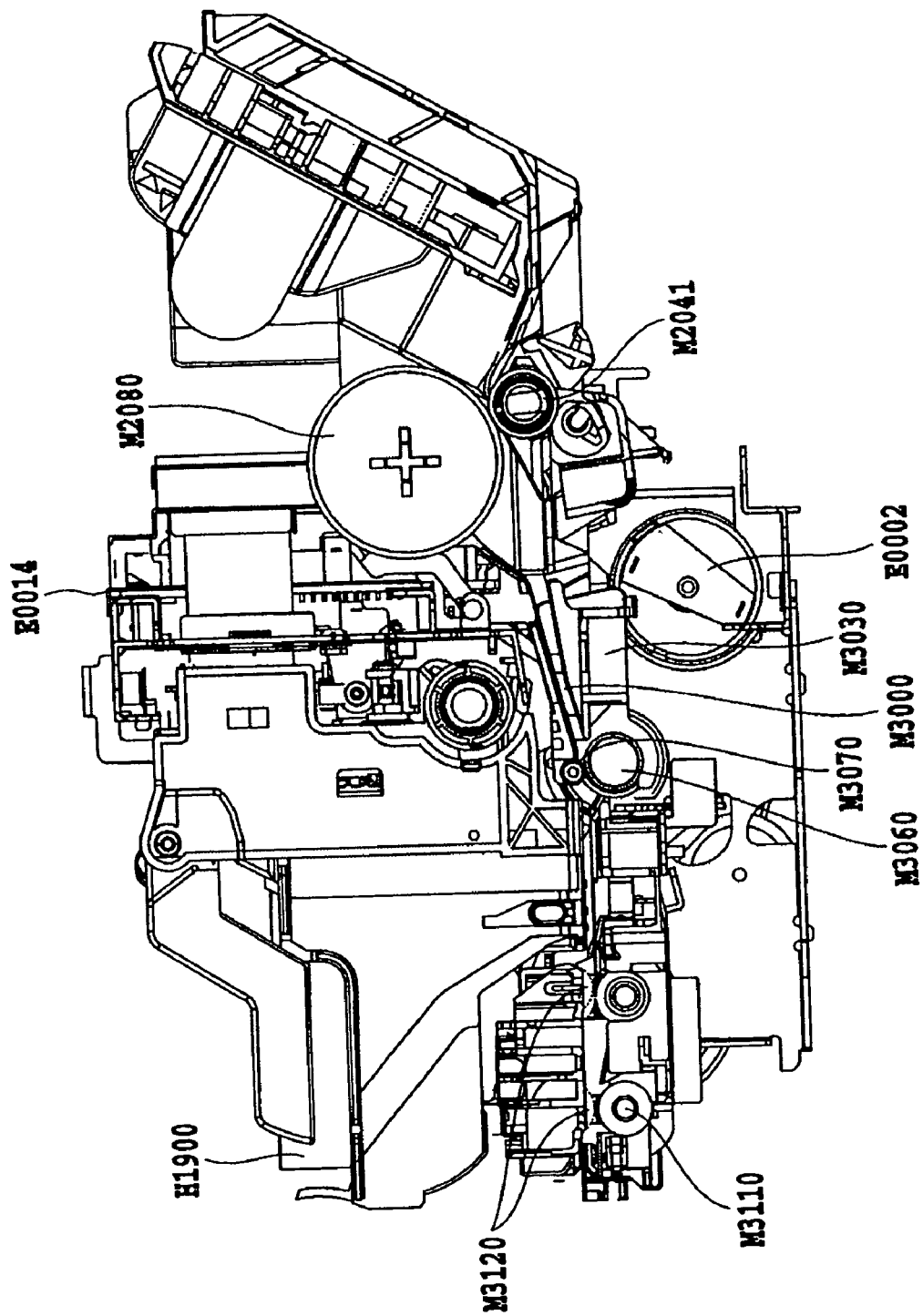
FIG. 3 is a cross-sectional view of the recording apparatus in accordance with the embodiment of the present invention.

The ink of the present invention described above can be suitably applied in an ink-jet recording apparatus described below. Hereinafter, a suitable ink-jet recording apparatus will be described with reference to the accompanying drawings. FIG. 1 is a perspective view of the ink-jet recording apparatus applied in an embodiment of the present invention. FIGS. 2 and 3 are diagrams for illustrating an internal mechanism of a main body of the recording apparatus, where FIG. 2 is a perspective view from the upper right thereof; and FIG. 3 is a cross-sectional side view of the main body of the recording apparatus.

For feeding sheets of paper in the recording apparatus applied in this embodiment, a predetermined number of recording mediums are transported to a nip portion composed of a feed roller M2080 and a separation roller M2041 in a sheet-feed portion having a sheet-feed tray M2060. Then, the recording mediums transported are separated in the nip portion such that the uppermost recording medium is transported to a sheet transport portion. The recording medium transported to the sheet transport portion is guided by a pinch roller holder M3000 and a paper guide flapper M3030 and then transported to a pair of rollers consisting of a transport roller M3060 and a pinch roller M3070. The roller pair consisting of the transport roller M3060 and the pinch roller M3070 is rotated by means of a driving force of an LF motor E0002. The rotation of the roller allows the recording medium to be transported over a platen M3040.

In a carriage portion, for forming an image on the recording medium, a recording head H1001 (FIG. 4) is disposed at a target image-forming position. Then, the recording head H1001 ejects ink droplets onto the recording medium according to signals from an electric substrate E0014. The detailed configuration of the recording head H1001 will be described later. The recording apparatus of the present invention is constructed so that an image is successively formed on the recording medium by alternately performing main-scanning recording in which the carriage M4000 scans in the column direction while recording the image with the recording head H1001 and sub-scanning recording in which the recording medium is transported in the row direction.

The recording medium on which the image has been formed finally is nipped between a first delivery roller M3110 and a spur M3120 at a delivery portion and then transported and ejected to a delivery tray M3160.

Furthermore, for cleaning the recording head H1001 before or after the image recording at a cleaning portion, undesired ink or the like is sucked from the recording head H1001 by actuating a pump M5000 while a cap M5010 is in close contact with the ink orifices of the recording head H1001. In addition, by sucking residual ink in the cap M5010 while keeping the cap M5010 open, an attempt is made to avoid the fixation by the residual ink and troubles resulting therefrom.

(Configuration of Recording Head)

Here, the configuration of the head cartridge H1000 applied in the recording apparatus described above will be described.

The head cartridge H1000 of this embodiment includes the recording head H1001, means for mounting an ink tank H1900, and means for supplying ink from the ink tank H1900 to the recording head H1001. The head cartridge H1000 is designed to be removably mounted on the carriage M4000.

Figure 4:
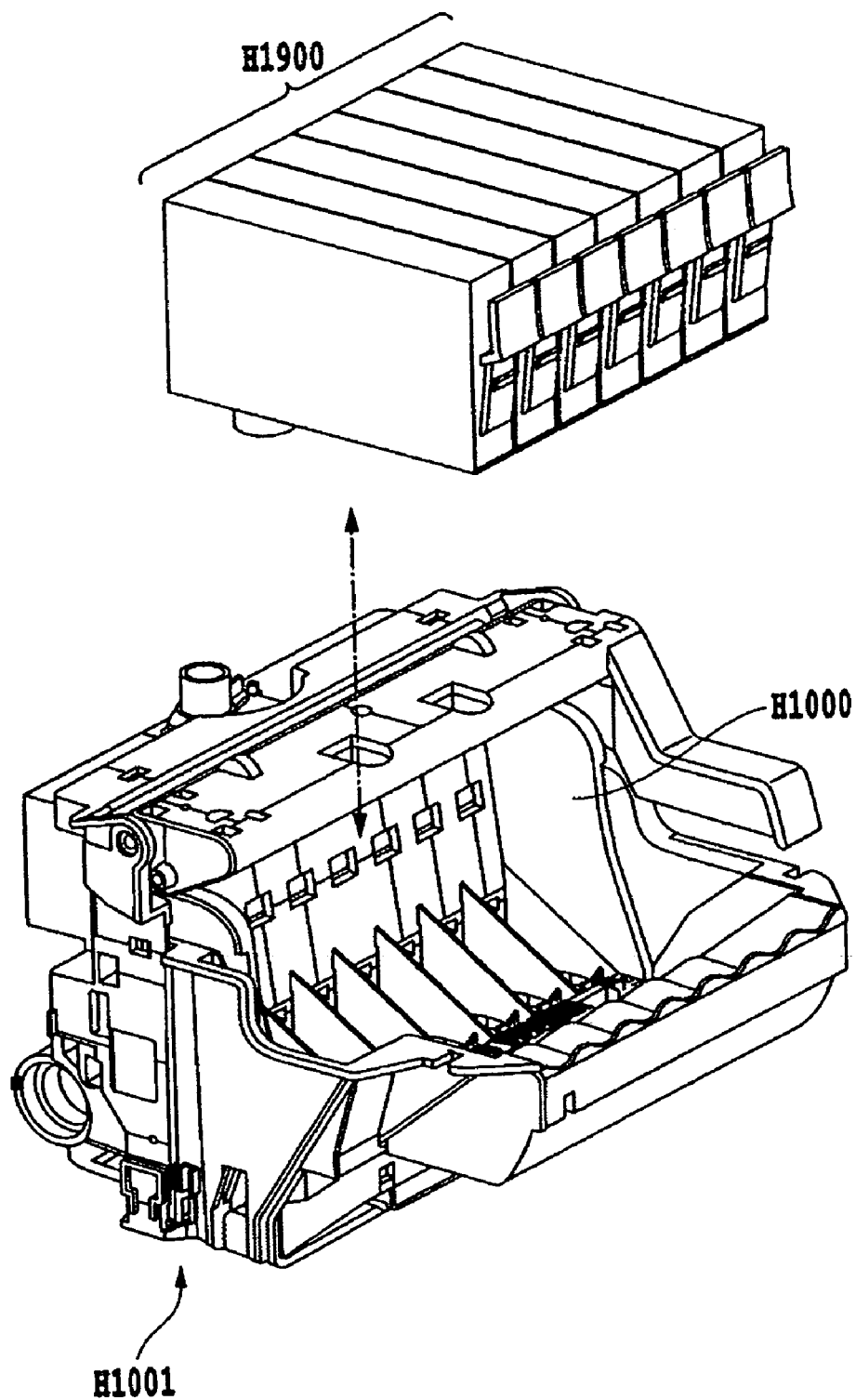
FIG. 4 is a perspective view of a head cartridge applied in the embodiment of the present invention, which shows how an ink tank is installed in the head cartridge.

FIG. 4 shows how the ink tank H1900 is attached on the head cartridge H1000 applied in this embodiment. In the recording apparatus of this embodiment, for the formation of an image with seven types of ink in different colors of cyan, magenta, yellow, black, red, light cyan, and light magenta, the seven ink tanks H1900 are separately prepared for the respective seven colors. As shown in the figure, each of the ink tanks H1900 can be removably mounted on the head cartridge H1000. Furthermore, the attachment and detachment of the ink tanks H1900 can be performed while the head cartridge H1000 is mounted on the carriage M400.

Figure 5:
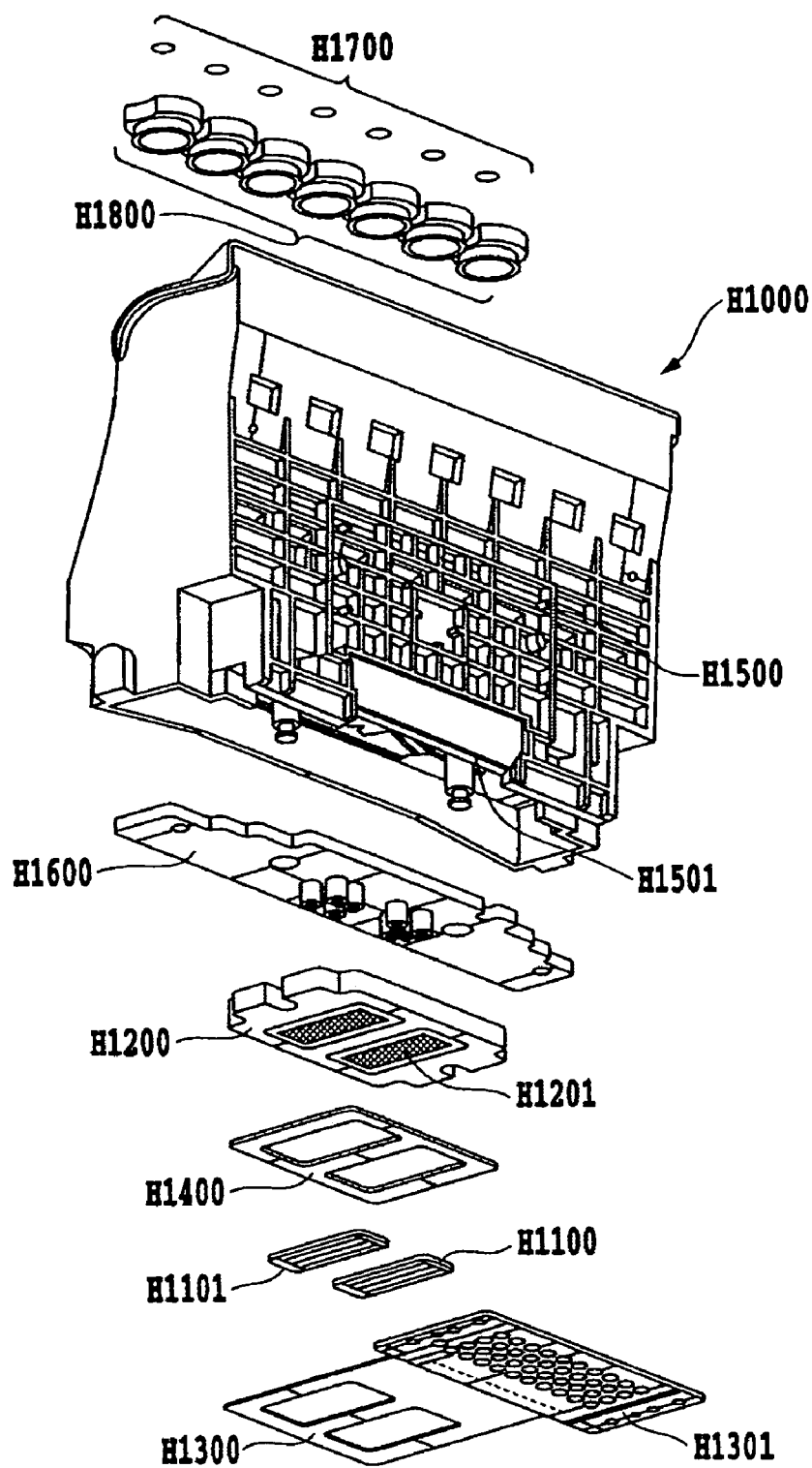
FIG. 5 is an exploded perspective view of the head cartridge applied in the embodiment of the present invention.

FIG. 5 is an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a sealing rubber H1800.

The recording apparatus of this embodiment is designed so that inks from the ink tanks H1900 for the respective seven colors are independently distributed into nine nozzle rows and then each of the inks is distributed to the first recording element substrate H1100 and the second recording element substrate H1101 in which the respective nozzle rows are formed.

The first recording element substrate H1100 and the second recording element substrate H1101 are Si substrates, respectively. A plurality of recording elements (nozzles) for ink ejection are formed on one side of each of the first recording element substrate H1100 and the second recording element substrate H1101 by means of photolithography. The electric wiring made of Al or the like for supplying electric power to each recording element is formed by a film-forming technology. Ink flow paths corresponding to the respective recording elements are also formed by means of photolithography. The electric wiring substrate H1300 is provided for applying electric signals to eject inks from the respective nozzles formed in the first recording element substrate H1100 and the second recording element substrate H1101. The electric wiring substrate H1300 includes electric wiring corresponding to the first recording element substrate H1100 and the second recording element substrate H1101 and an external signal input terminal H1301 arranged on the end portion of the electric wiring for receiving electric signals from the main body of the recording apparatus. Furthermore, ink-supplying ports H1201 for supplying inks into a plurality of ink flow paths are formed in the first plate 1200 and opened to the back side of the first plate H1200.

Figure 6:
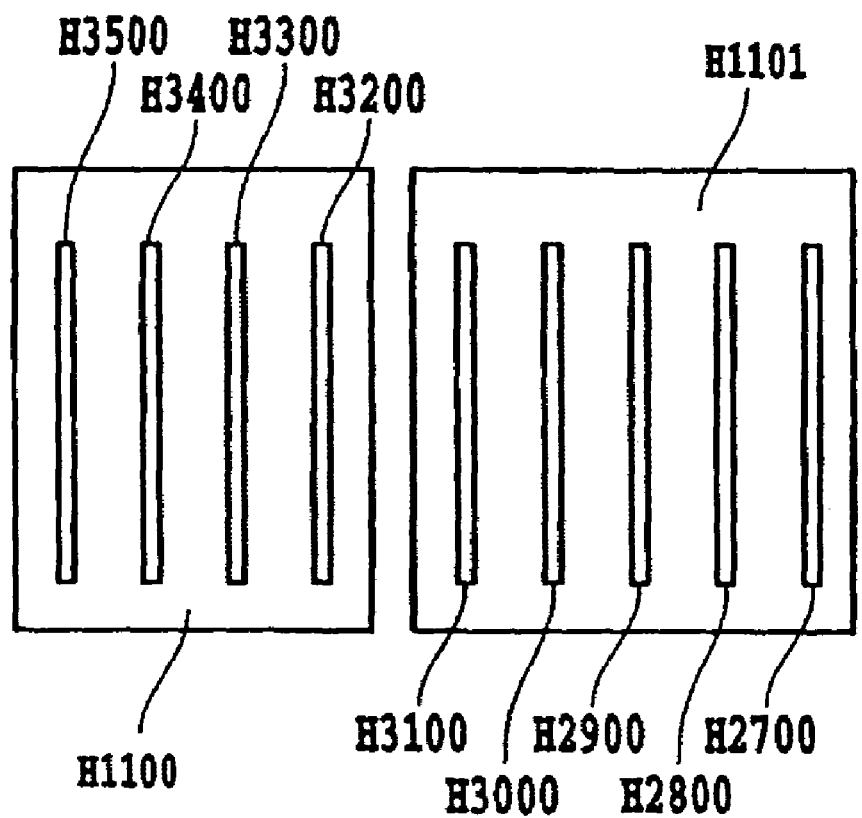
FIG. 6 is a front view of the substrate of a recording element in the head cartridge applied in the embodiment of the present invention.

FIG. 6 is an enlarged front view for illustrating the configurations of the first recording element substrate H1100 and the second recording element substrate H1101 in this embodiment, respectively. In the figure, reference numerals H2700 to H3500 denote nozzle rows that correspond to identical or different colors, respectively. The first recording element substrate H1100 is composed of different nozzle rows in four colors: a nozzle row H3200 to which a light cyan ink is supplied, a nozzle row H3300 to which a black ink is supplied, a nozzle row H3400 to which a red ink is supplied, and a nozzle row H3500 to which a light magenta ink is supplied.

The second recording element substrate H1101 includes five different nozzle rows for three colors. That is, there are two nozzle rows H2700 and H3100 to which a cyan ink is supplied, two nozzle rows H2800 and H3000 to which a magenta ink is supplied, and a nozzle row H2900 to which a yellow ink is supplied. The nozzle row H2900 for yellow ink is arranged in the middle of the five rows and the magenta and cyan nozzle rows are arranged on both sides of the yellow nozzle row H2900 in line.

Each nozzle row includes 768 nozzles arranged in the direction of transferring a recording medium at intervals of 1,200 dpi (dot/inch; reference value) and each of the nozzles ejects ink droplets of about 2 pl in volume. In addition, the orifice of each nozzle has an opening area of about 100 $\mu m^2$.

Thus, as the cyan, magenta, and yellow nozzle rows are symmetrically arranged in the scanning direction of the carriage M4000, when the printing is carried out in both directions with the carriage M4000, adverse effects on an image such as color unevenness is suppressed at the time of printing. The color unevenness is mainly caused by the difference in coloring properties depending on the difference in order of colors of inks adhering on the recording medium. By arranging two nozzle rows of magenta and cyan inks symmetrically with respect to the nozzle row H2900 of a yellow ink as in this embodiment, the order in which inks adhere to the recording medium can be set uniform by changing the nozzle rows used in the forward and backward printing movements. Consequently, the advantage of this embodiment includes the ability of bi-directionally forming a high quality image at high speed.

In addition, the arrangement of nozzle rows for all of seven colors is preferably symmetrical. However, such an arrangement will result in enlargement of the equipment, cost increase, and complication of data processing. Therefore, in this embodiment, only cyan, magenta, and yellow nozzle rows are arranged symmetrically because these three colors largely contribute to the color unevenness particularly at the time of bi-directional printing.

Moreover, the ink flow path H1501 of this embodiment is branched into a cyan ink flow path and a magenta ink flow path. The ink flow path H1501 is designed such that the ink supplied from a single ink tank can be distributed into two nozzle rows.

Here, as an example of the recording head, there is described a recording head of a Bubble Jet (registered trademark) system in which recording is carried out using an electrothermal converter (recording element) that generates thermal energy for generating a film boiling phenomenon in ink in response to an electric signal.

With respect to the typical construction and principle thereof, those using the basic principle as disclosed in, for example, U.S. Pat. Nos. 4,723,129 and 4,740,796 are preferred. This system may be applied to any of the so-called on-demand type and the continuous type. In particular, the on-demand type is effective because at least one driving signal which corresponds to recording information and causes a rapid temperature rise exceeding film boiling is applied to an electrothermal converter arranged corresponding to a sheet or liquid flow path, in which a liquid (ink) is held, thereby causing the electrothermal converter to generate thermal energy to cause film boiling on the heat-acting surface of a recording head, so that a bubble can be formed in the liquid (ink) in response to the driving signal in a one-to-one correspondence. The liquid (ink) is ejected through an ejection opening by the growth-contraction of the bubble to form at least one droplet. When the driving signal is applied in the form of a pulse, the growth-contraction of the bubble is suitably conducted in a moment, so that the ejection of the liquid (ink) particularly excellent in responsiveness can be achieved. It is therefore preferable to use such pulsed signals.

Moreover, as a second form of the ink-jet recording apparatus using the mechanical energy, there is provided an on-demand recording head including a nozzle-forming substrate having a plurality of nozzles, a pressure-producing element made of a piezoelectric material and an electroconductive material arranged opposite to a nozzle, and an ink filled in the surrounding portion of the pressure-producing element. In this case, the pressure-producing element can be displaced with an applied voltage to eject a small ink droplet from a nozzle.

In addition, the ink cartridge may be one that contains ink to be supplied to the recording head through an ink-supplying member such as a tube.

Furthermore, in the ink-jet recording apparatus used in the present invention, the recording head and the ink cartridge are not limited to separate ones as mentioned above. The recording apparatus of the present invention may be the recording head and the ink cartridge which are integrated.

Furthermore, the ink-jet recording apparatus may be designed such that the ink containing portion is constructed like an ink bag in which a spring or the like is installed, instead of using an ink absorber.

EXAMPLES

Here, the present invention will be described in more detail with reference to examples and comparative examples.

At first, for selecting a water-soluble organic solvent to be used in the examples and comparative examples, pure water and various water-soluble organic solvents having vapor pressures at 25° C. lower than that of water were subjected to the measurement for their solubility in Exemplified Compound 1 described below to be used as a coloring material of ink by the method previously described, respectively. The obtained results are listed in Table 1. In Table 1, the water-soluble organic solvents were classified into water-soluble organic solvents A giving a solubility of Exemplified Compound 1 higher than its solubility in water and water-soluble organic solvents B giving a solubility of Exemplified Compound 1 equal to or lower than its solubility in water.

TABLE 1

Exemplified Compound 1

[Structure: naphthalene with OH, N=N linkage to phenyl-SO₃Na, with NaO₃S substituent]

Solubility of coloring materials in respective water-soluble organic solvents

| | Water-soluble organic solvent | Solubility |
|---|---|---|
| A | Glycerin | 25% or more |
| | Ethylene glycol | 25% or more |
| | Polyethylene glycol 200 | 25% or more |

TABLE 1-continued

Exemplified Compound 1

[Structure: naphthalene with OH, N=N linkage to phenyl-SO₃Na, with NaO₃S substituent]

Solubility of coloring materials in respective water-soluble organic solvents

| | Water-soluble organic solvent | Solubility |
|---|---|---|
| B | Diethylene glycol | 22% |
| | Pure water | 15% |
| | Triethylene glycol | 13% |
| | 2-Pyrrolidone | 6% |
| | 1,5-pentanediol | 5% or less |

As described above, the ink of the present invention includes a combination of two or more water-soluble organic solvents so that the solubility difference between the solubilities of Exemplified Compound 1 (water-soluble coloring material) in the water-soluble organic solvent A and in the water-soluble organic solvent B is 10% or more.

Therefore, from the results in Table 1, in the following examples, glycerin, ethylene glycol, polyethylene glycol 200, and diethylene glycol can be used as the water-soluble organic solvent A having a higher solubility and triethylene glycol, 2-pyrrolidone, and 1,5-pentanediol can be used as the water-soluble organic solvent B having a comparable or lower solubility. Particularly preferable water-soluble organic solvents A include glycerin, ethylene glycol, and polyethylene glycol 200, and particularly preferable water-soluble organic solvents B include 2-pyrrolidone, and 1,5-pentanediol.

Examples 1 to 8 and Comparative Examples 1 to 4

Inks of Examples 1 to 8 and Comparative Examples 1 to 4 were prepared by mixing the respective ingredients listed in Table 2-1 and Table 2-2 and sufficiently stirring the mixture to dissolve them, followed by filtering the resulting solution through a 0.20-μm filter under pressure. Furthermore, the ingredients in the ink compositions shown in Tables 2-1 and 2-2 are based on "mass %", respectively.

TABLE 2-1

Ink compositions of Examples 1 to 8

| | | Blending amount (mass %) Example | | | | | | | |
|---|---|---|---|---|---|---|---|---|---|
| | | 1 | 2 | 3 | 4 | 5 | 6 | 7 | 8 |
| Water-soluble coloring material | Exemplified compound 1 | 4 | 4 | 4 | 4 | 4 | 4 | 4 | 4 |
| Water-soluble organic | Glycerin | 7 | 7 | 7 | — | 6.4 | 7 | 5 | 9 |
| | Ethylene glycol | 8 | 9 | 7 | 9 | 5 | — | 3 | 9 |

TABLE 2-1-continued

Ink compositions of Examples 1 to 8

| | | Blending amount (mass %) Example | | | | | | | |
|---|---|---|---|---|---|---|---|---|---|
| | | 1 | 2 | 3 | 4 | 5 | 6 | 7 | 8 |
| solvent A | Polyethylene glycol 200 | — | — | — | 3 | — | — | — | — |
| | Diethylene glycol | — | — | — | — | 3 | 5 | — | — |
| Water-soluble organic solvent B | Triethylene glycol | — | — | — | — | — | — | — | — |
| | 2-Pyrrolidone | 5 | 5 | — | 3 | 4 | 5 | 9 | — |
| | 1,5-pentanediol | — | — | 5 | 3 | — | 3 | — | 4 |
| Urea compound | Urea | 7 | — | — | — | 5 | 5 | 5 | — |
| | Ethylene urea | — | 5 | 7 | 5 | — | — | — | 5 |
| Other solvent | Isopropyl alcohol | 2 | 2 | 2 | 2 | 2 | 2 | 2 | 2 |
| Surfactant | Acetylenol E100 (*) | 0.6 | 0.6 | 0.6 | 0.6 | 0.6 | 0.6 | 0.6 | 0.6 |
| water | Ion-exchanged water | 66.4 | 67.4 | 67.4 | 70.4 | 70.0 | 68.4 | 71.4 | 66.4 |

(*): Manufactured by Kawaken Fine Chemicals KK

TABLE 2-2

Ink compositions of Comparative Examples 1 to 4

| | | Blending amount (mass %) Comparative Example | | | |
|---|---|---|---|---|---|
| | | 1 | 2 | 3 | 4 |
| Water-soluble coloring material | Exemplified Compound 1 | 4 | 4 | 4 | 4 |
| Water-soluble organic solvent A | Glycerin | 9 | 9 | — | — |
| | Ethylene glycol | 9 | 9 | — | — |
| | Polyethylene glycol 200 | — | 2 | — | — |
| | Diethylene glycol | — | — | 12 | — |
| Water-soluble organic solvent B | Triethylene glycol | — | — | 8 | 3 |
| | 2-Pyrrolidone | 7 | — | — | 8 |
| | 1,5-pentanediol | — | — | — | 10 |
| Urea compound | Urea | — | — | 7 | — |
| | Ethylene urea | — | 7 | — | 5 |
| Other solvent | Isopropyl alcohol | 2 | 2 | 2 | 2 |
| Surfactant | Acetylenol E100 (*) | 0.6 | 0.6 | 0.6 | 0.6 |
| Water | Ion-exchanged water | 68.4 | 66.4 | 66.4 | 67.4 |

(*): Manufactured by Kawaken Fine Chemicals KK

<Evaluation of Ink>

Each ink of Examples 1 to 8 and Comparative Examples 1 to 4 obtained as described above was put on an ink-jet printer Pixus 950i (trade name, manufactured by Canon Inc., an ink-jet printer having an on-demand type multi-recording head that ejects ink by applying thermal energy to the ink in response to recording signals. Then, the ink was evaluated for the ink clogging in an orifice portion, deposition of a dye, and ink bleeding at high temperature and humidity according to the process and criteria described below. The results obtained by the evaluation using the inks of Examples 1 to 8 and Comparative Examples 1 to 4 are listed in Table 3, respectively.

(1) Ink Clogging in Orifice Portion and Deposition of Dye

Each of inks obtained in the Examples and the Comparative Examples was filled in the printer described above and then the printer was allowed to carry out its recovery movement to print out a sheet of print patterns for print check. Subsequently, a recording unit is detached from the main body of the ink-jet printer. Then, the recording head on which ink tanks were mounted was directly left standing for 14 days under the environmental conditions of 35° C. and 5 to 20% RH and then left standing for 24 hours at 25° C., followed by visual observation of the nozzles of the recording head. Subsequently, the recording head was mounted on the printer again and then was allowed to print out a sheet of print patterns for print check. The results are evaluated on the basis of the following criteria:

AA: No deposition of the dye in nozzles was observed. Normal printing was possible even after leaving the recording head.

A: Substantially no deposition of the dye in nozzles was observed. Normal printing was possible even after leaving the recording head.

B: Deposition of the dye in nozzles was observed. Normal printing was possible even after leaving the recording head.

C: Deposition of the dye was observed in nozzles and normal printing requires a recovery operation several times.

(2) Ink Bleeding at High Temperature and Humidity Upon Printing on Coated Paper

Each of inks obtained in the Examples and the Comparative Examples was filled in the printer described above and then solid patterns including outline characters on a colored background were printed on gloss paper (PR-101, manufactured by Canon Inc.). The resulting print was dried naturally for 24 hours and then left standing under high temperature and humidity conditions (30° C./80% RH) for 1 week. Then, visual observation was performed to determine whether the ink bleeding was caused in the outline characters and the results were evaluated on the basis of the following criteria:

AA: Ink bleeding was not observed.

A: Ink bleeding was slightly observed.

B: Ink bleeding was observed but the outline characters were not blurry.

C: Ink bleeding was observed and part of the outline characters were blurry.

TABLE 3

| | Evaluation results | | |
|---|---|---|---|
| | Clogging, Dye deposition | Ink bleeding at high temperature and humidity | Remarks |
| Example 1 | AA | AA | Solubility difference of 19% or more, A:B = 3:1 |
| Example 2 | AA | AA | Solubility difference of 19% or more, A:B≈3:1 |
| Example 3 | AA | AA | Solubility difference of 20% or more, A:B≈3:1 |
| Example 4 | A | AA | Solubility difference of 19% or more, A:B = 2:1 |
| Example 5 | AA | A | Solubility difference of 16%, A:B = 3.6:1 |
| Example 6 | A | AA | Solubility difference of 16%, A:B = 2.4:1 |
| Example 7 | B | AA | Solubility difference of 19% or more, A:B≈0.9:1 |
| Example 8 | AA | B | Solubility difference of 20% or more, A:B≈4.5:1 |
| Comparative Example 1 | C | A | No urea compound, A:B≈2.6:1 |
| Comparative Example 2 | A | C | Water-soluble organic solvent A only |
| Comparative Example 3 | A | C | Solubility difference of less than 10%, A:B≈1.5:1 |
| Comparative Example 4 | C | A | Water-soluble organic solvent B only |

As described above, the present invention provides the ink for ink-jet recording, the recording method, the recording unit, the ink cartridge, and the recording apparatus, which does not cause clogging in an ejection orifice portion and deposition of a coloring material, while retaining good print quality without ink bleeding even after leaving an image printed on coated paper or the like having an ink-receiving layer for a long term under high temperature and humidity conditions.

This application claims priority from Japanese Patent Application No. 2003-207040 filed on Aug. 11, 2003, which is hereby incorporated by reference herein.

What is claimed is:

1. An ink, comprising water, a water-soluble coloring material having a molecular weight of 600 or less in a free acid form, at least two kinds of water-soluble organic solvents, and urea or a derivative thereof, wherein the ink satisfies conditions that:

(1) the at least two kinds of water-soluble organic solvents show a vapor pressure lower than the vapor pressure of water at 25° C.;

(2) when a comparison is made between a solubility of the water-soluble coloring material in each of the water-soluble organic solvents and a solubility of the water-soluble coloring material in water, the water-soluble organic solvents that satisfy the condition (1) include a water-soluble organic solvent A giving the solubility higher than the solubility in water and a water-soluble organic solvent B giving the solubility equal to or lower than the solubility in water; and (3) the solubility difference between the solubility of the water-soluble coloring material in the water-soluble organic solvent A and the solubility of the water-soluble coloring material in the water-soluble organic solvent B is 10% or more; and wherein the water-soluble coloring material is represented by the following general formula (I) in a free acid form:

General Formula (I)

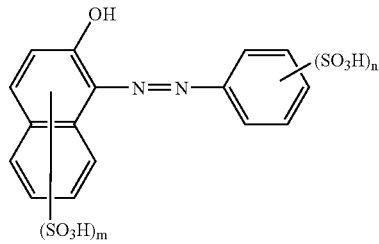

wherein m is an integer of 0 to 2, n is an integer of 0 to 1 where (m+n) is an integer of 1 or more.

2. An ink according to claim 1, wherein the total amount of the water-soluble organic solvent A and the water-soluble organic solvent B is 80 mass % or more with respect to the total amount of the water-soluble organic solvent in the ink.

3. An ink according to claim 1, wherein the mixing ratio between the water-soluble organic solvent A and the water-soluble organic solvent B is 4:1 to 1:1 (the water-soluble organic solvent A : the water-soluble soluble organic solvent B) on the mass basis.

4. An ink-jet recording method, comprising ejecting droplets of ink from an orifice in response to a recording signal, wherein the ink is the ink according to claim 1.

5. A recording unit, comprising:

an ink containing portion containing the ink according to claim 1; and a head portion for ejecting droplets of the ink.

6. An ink cartridge, comprising an ink containing portion containing the ink according to claim 1.

7. A recording apparatus, comprising a recording unit that includes:

an ink containing portion containing the ink according to claim 1; and a head portion for ejecting droplets of the ink.

8. An ink according to claim 1, wherein the water-soluble coloring material is represented by the following formula.

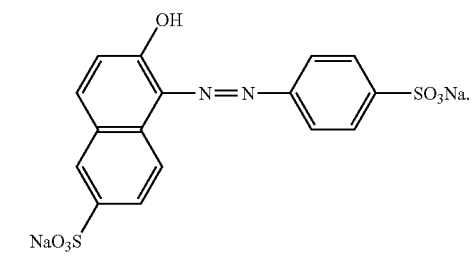

9. An ink according to claim 8, wherein the water-soluble organic solvent A is selected from the group consisting of glycerin, ethylene glycol, diethylene glycol and polyethylene glycol.

10. An ink according to claim 8, wherein the water-soluble organic solvent B is selected from the group consisting of 2-pyrrolidone and 1,5-pentanediol.

11. An ink according to claim 9, wherein the water-soluble organic solvent B is selected from the group consisting of 2-pyrrolidone and 1,5-pentanediol.

* * * * *

UNITED STATES PATENT AND TRADEMARK OFFICE
CERTIFICATE OF CORRECTION

PATENT NO. : 7,025,817 B2  Page 1 of 1
APPLICATION NO. : 11/050784
DATED : April 11, 2006
INVENTOR(S) : Tsuyoshi Kanke et al.

It is certified that error appears in the above-identified patent and that said Letters Patent is hereby corrected as shown below:

COLUMN 11:
Line 51, "to-which" should read --to which--.

COLUMN 13:
Line 31, "TABLE 1" should be deleted.
Line 44, "Solubility of color materials" should read --            TABLE 1
        Solubility of coloring materials--.

Signed and Sealed this

Thirtieth Day of October, 2007

JON W. DUDAS
*Director of the United States Patent and Trademark Office*